J. W. O'DONNELL.
AUTOMOBILE COVER.
APPLICATION FILED OCT. 5, 1914.
1,164,853.
Patented Dec. 21, 1915.
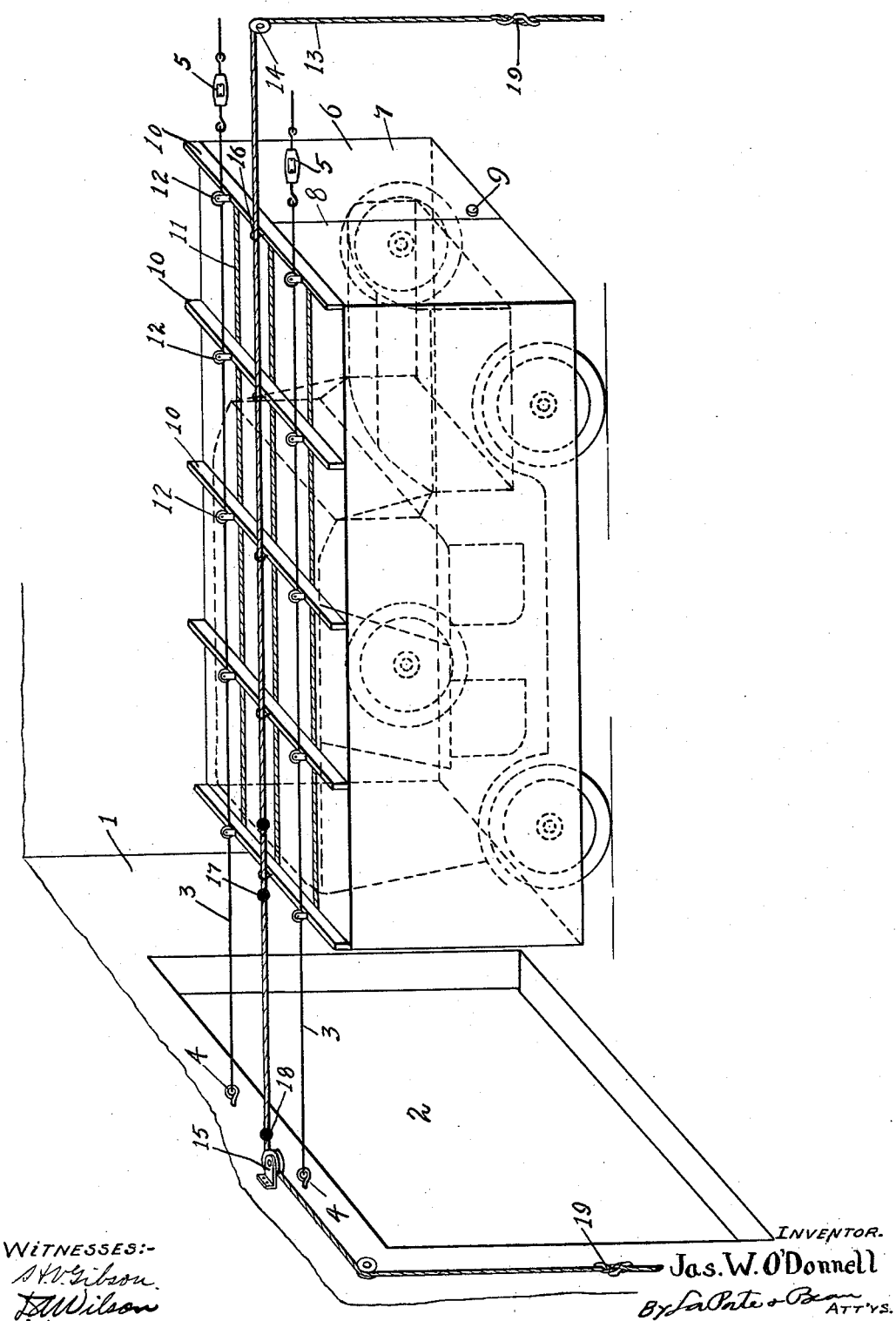
WITNESSES:-
A. V. Gibson
J. A. Wilson
INVENTOR.
Jas. W. O'Donnell
By LaPorte & Bean
ATT'YS.

UNITED STATES PATENT OFFICE.

JAMES W. O'DONNELL, OF OTTAWA, ILLINOIS.

AUTOMOBILE-COVER.

1,164,853.  Specification of Letters Patent.  Patented Dec. 21, 1915.

Application filed October 5, 1914. Serial No. 865,073.

*To all whom it may concern:*

Be it known that I, JAMES W. O'DONNELL, a citizen of the United States, a resident of Ottawa, in the county of La Salle and State of Illinois, have invented new and useful Improvements in Automobile-Covers, of which the following is a specification.

My invention relates to improvements in covers for automobiles and the like, the principal object being the provision of such a device which is simple in construction and easy to operate.

A further object of this invention is the provision of a cover for automobiles or other vehicles, which, when not in use, may be drawn up out of the way and which may be readily extended to cover the automobile or other vehicle, as occasion requires.

A further object is the provision of a flexible cover, having a plurality of transverse slats, bars or members attached thereto, the latter being movable on longitudinally extending supporting members, with means for moving said cover to a contracted or extended position.

Further objects include improvements in the details of construction and arrangement, whereby a simple and efficiently operated device is provided.

To the accomplishment of the foregoing and such other objects as may hereinafter appear, my invention consists in the construction, combination and arrangement of parts hereinafter described and then sought to be defined in the appended claim, reference being had to the accompanying drawing forming a part hereof and in which is illustrated a preferred embodiment of my invention, it being understood that this showing is made for the purpose of illustrative disclosure only and that various changes may be made in practice within the scope of the claim, without digressing from my inventive idea.

In use, automobiles and other vehicles are frequently stored for a considerable time and depreciate materially in value from the settling of dust and dirt thereon, and it is the purpose of my invention to provide a cover therefor, which may be readily and conveniently thrown into position to cover the vehicle, and may be readily withdrawn to a contracted position so as to permit the vehicle to be removed.

Referring now to the drawings, the numeral 1 indicates a portion of the room, garage or barn, in which an automobile or vehicle is adapted to be kept or stored, having the usual entrance door 2. I provide a plurality of longitudinally extending supporting members or means in the form of flexible wires or cables 3, secured to the wall by means of the I-bolts 4 and having the turn buckles 5 so that any slack may be taken up, as necessary. These supporting members 3 are adapted to support the cover for the automobile or other vehicle, which cover 6 may be made of canvas or any other suitable material and is substantially rectangular in cross section. Of course the size and shape will vary in use, depending on the size of the vehicle designed to be covered. The ends 7 of the cover are open as indicated at 8 and provided with any suitable detachable connecting means 9. This cover 6 is secured to a plurality of transversely extending slats, bars or members 10 and has the longitudinally extending flexible members, preferably ropes or cables 11, connecting said transversely extending slats, bars or members 10, so as to receive the strain of pulling and relieve the cover itself therefrom. Each of the transverse slats, bars or members 10 is provided with means adapted to engage and be moved on said supporting means 3. In the embodiment shown, this means takes the form of the pulleys 12, which ride on the supporting wires or cables 3, as is evident from a consideration of the drawing.

In the position shown in the drawing, the device is in use or extended so as to cover the automobile or other vehicle. It is adapted to be drawn against one of the walls of the room, preferably the wall opposite the door, so as to permit the exit of the automobile or other vehicle. Means for thus operating the cover, includes the flexible cable or rope 13 which runs over suitable pulleys 14 and 15, and through the eyes or similar members 16 on the transverse slats, bars or members 10. This member is adapted to be pulled in either direction and has means thereon providing stops or abutments 17 which may be in the form of knots in the rope or in the form of extra members, if desired. This will engage the eye of the end one of the transverse bars or members so as to move it in either direction. Another stop member 18 is provided adjacent to pulley 15, so as to limit the movement of the cover in the direction toward the door. Suitable cleats 19 are provided for holding the cover in its adjusted position.

When in use, the cover assumes the position shown in the drawing. When it is desired to remove the car or other vehicle, the end of the rope 13 away from the door is pulled and the stop or abutment 17 engaging the eye in the end transverse bar or member, moves the transverse bars or members toward the rear wall of the room, telescoping the cover and removing it entirely from the car or vehicle, it being understood that the connection 9 on the front end of the cover has been opened, so as to permit the ends of the cover to slide or move over the car or vehicle. When not in use, the cover is drawn up against the wall and takes up very little space, not interfering with the use of the room for other purposes.

As is evident from this description and the drawing, the device is simple, may be readily assembled and mounted for use; is strong and durable in construction and gives ample protection to the car or vehicle from dirt or dust.

What I claim is:

In a device of the character described and in combination, a plurality of supporting members, a plurality of transverse bars or members movable on said supporting members, a flexible cover member secured to said bars or members, and means for moving said transverse bars or members so as to extend and contract said cover member.

JAMES W. O'DONNELL.

Witnesses:
O. HALBUT,
CHARLES E. HOOK.

Copies of this patent may be obtained for five cents each, by addressing the "Commissioner of Patents, Washington, D. C."